United States Patent Office 2,781,342
Patented Feb. 12, 1957

2,781,342

STEROID ENAMINES

Milton E. Herr, Kalamazoo Township, Kalamazoo County, and Frederick W. Heyl, Kalamazoo, Mich., assignors to The Upjohn Company, Kalamazoo, Mich., a corporation of Michigan No Drawing. Application May 17, 1952,
Serial No. 288,546

20 Claims. (Cl. 260—239.5)

The present invention relates to steroid enamines and is more particularly concerned with the novel enamine derivatives of 3-ketosteroids and to a process for the production thereof.

It is an object of the present invention to provide a group of novel compounds, the 3-enamine derivatives of 3-ketosteroids. Another object of the present invention is the provision of a process for the production of 3-enamine derivatives of 3-ketosteroids. A further object of the present invention is to provide a method through the formation of an enamine, whereby the ketone at the 3-position of a steroid is protected while transformations are conducted at other points of the molecule. A still further object of the invention is the provision of a process wherein the ketone group at the 3-position of a polycarbonyl steroid is selectively converted to an enamine derivative. Other objects of the invention will be apparent to one skilled in the art to which this invention pertains.

The steroid enamine compounds of the present invention are steroids which contain a vinyl amine grouping (>N—C=C—) in the A ring of the steroid nucleus, both the amine group and the double bond being attached to the 3-carbon atom. Such compounds are produced when a 3-carbonyl oxygen of a steroid, on reaction with a secondary amine, is converted to an amino group and at the same time a double bond which is attached to the 3-carbon atom is introduced in the nucleus. Such enamine derivatives of 3-ketosteroids are very useful as blocking agents for the 3-ketone group since regeneration of the ketone group involves simple treatment of the enamine with an acid and is accomplished readily and in high yields of desired 3-ketosteroid. The process and products of the present invention provide a method whereby the 3-ketone group, which is an essential part of many of the physiologically active steroid hormones, is protected while transformations on other parts of the molecule are accomplished. Furthermore, it has been found that according to the process of the present invention the 3-ketone group may be converted to an enamine selectively over other ketone groups in the steroid molecule. This finding makes it possible to maintain the important 3-ketone group, through the formation of an enamine, while other ketone groups in the molecule are converted to more desirable substituents. For example, the physiologically active hormone, testosterone, is prepared from 4-androstene-3,17-dione via the enamine derivatives. This is more specifically described in Examples 12, 13, and 14, wherein, 4-androstene-3,17-dione is converted to 3-(N-pyrrolidyl)-3,5-androstadien-17-one, and with the 3-ketone thus protected, the 17-ketone is reduced to a 17-hydroxyl. Regeneration of the 3-ketone in the 3-(N-pyrrolidyl)-3,5-androstadien-17-ol thus-produced yields 4-androsten-17-ol-3-one, e. g., testosterone. Other transformations of 3-ketosteroids having additional keto groups elsewhere in the molecule can be similarly accomplished.

Starting materials for the method of the present invention are steroid compounds which have a ketone group at the 3-position of the steroid nucleus. The nucleus may have other substituents such as, for example, ketone, hydroxy, acyloxy, carbalkoxy, and the like, attached to one or more of the other carbon atoms of the nucleus, such as, for example, 7, 11, 12, 17 and other positions. In addition the nucleus may contain double bonds. These double bonds may be either isolated or conjugated and they may also be conjugated with the carbonyl oxygen at the 3-position. If the carbonyl oxygen at the 3-position is conjugated with a 4(5)-double bond, as in the case in the $\Delta^4$-3-ketosteroids, the 4(5)-double bond shifts to the 5(6)-position during the course of the reaction. The side-chain at the 17-position of the nucleus, if a side-chain is present, may be any one of the natural side-chains such as, for example, those found in the sterols, bile acids, and pregnanes, or any of the various substitution and degradation modifications of these side-chains.

Representative 3-ketosteroids which may be used as starting material include, for example, sterols such as cholestanone, cholestenone, stignastadienone, coprostanone, cholestane-3,6 - dione, 4,7,22-ergostatrien-3-one; bile acids such as dehydrocholic acid esters, dehydrodesoxycholic acid esters, 3-ketocholanic acid esters, 3-ketocholenic acid esters; pregnanes such as, progesterone, 17α-hydroxyprogesterone, 11-ketoprogesterone, pregnane-3,20-dione, pregnane-3,11,20-trione, 11α-hydroxyprogesterone, 11β - hydroxyprogesterone, 11α - acyloxyprogesterone, cortisone, 21 - acyloxy - 17α -- hydroxypregnane-3,11,20-trione; androstanes such as, androstane-3,17-dione, 4-androstene-3,17-dione, testosterone, 17-methyltestosterone, 16-androsten-3-one, 17-acyloxyandrostan-3-one, androstan-17-ol-3-one; and the like.

According to the process of the present invention, a ketone group at the 3-position of a steroid is converted to an enamine derivative by reaction with secondary amine. These enamine derivatives are preferably prepared by heating a 3-ketosteroid with a secondary amine, in an organic solvent, removing the water as it is formed in the course of the reaction, and isolating the enamine thus-formed. The water that is formed can be removed by azeotropic distillation or by a basic inorganic water-binding agent such as potassium carbonate, calcium oxide, barium oxide, and the like. Conditions for the formation of such enamines include a reaction temperature between approximately 25 and approximately 150 degrees centigrade, preferably between forty and 110 degrees centigrade and conveniently at the reflux temperature of the reaction mixture, but always below the decomposition temperature of the ultimate reaction product, i. e., the enamine. The reaction time varies according to the reactivity of the amine and the temperature of the reaction. Ordinarily a reaction period of from about thirty minutes to twenty hours is most satisfactory when a temperature within the preferred range is employed. Although the preferred amount of secondary amine employed is in the ratio of four moles of amine to one mole of steroid, ratios of about one mole to about twenty moles or more of amine to one mole of steroid are operative. Among the solvents which can be used are diethyl ether, tetrahydrofuran, an excess of the amine, benzens, xylene, toluene, pentane, hexane, and the like.

Sometimes an acid catalyst is added as an aid to the reaction and to enhance the yield of product. For this purpose paratoluensulfonic acid, naphthalenesulfonic acid, sulfuric acid, and the like may be used. Paratoluenesulfonic acid is usually the preferred catalyst for this purpose. Sometimes, particularly if the amine employed reacts difficultly, pressure is employed in which case the reaction is carried out in a bomb.

The enamines thus obtained are usually well-defined crystalline solids which are soluble in methylene chloride, chloroform, and the like, and are moderately soluble in methanol, acetone, diethyl ether, and the like, but insoluble in water. They also form crystalline acid-addition salts of unknown structure from which the enamine can be recovered by mild treatment with an inorganic base.

Representative secondary amines which can be employed in the preparation of steroid enamines from 3-ketosteroids include dialkylamines such as diethylamine, dipropylamine, dibutylamine, dihexylamine, dioctylamine, and didodecylamine; cycloakylamines such as dicyclohexylamine and the like; cyclic amines such as piperidine, pyrrolidine, tetrahydroquinoline, oxazolidine (tetrahydrooxazole), morpholine and the like; aralkylalkylamines such as N-methylbenzylamine, N-ethylbenzylamine and the like; substituted dialkylamines such as diethanolamine and the like; and arylalkylamines such as N-methylaniline, N-methyltoluidine, N-methylanisidine, and the like. The preferred secondary amine is usually pyrrolidine.

The following examples are illustrative of the process and products of the present invention, but are not to be construed as limiting.

*Example 1.—3-(N-pyrrolidyl)-3,5-cholestadiene*

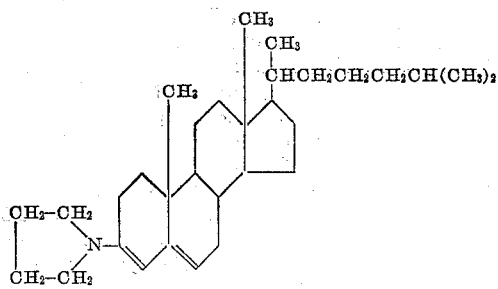

A solution of 7.69 grams (0.02 mole) of 4-cholesten-3-one and 6.52 milliliters (0.08 mole) of pyrrolidine in 100 milliliters of benzene was placed in a reaction flask which was equipped with a reflux condenser and a water trap so arranged that the condensed vapors passed through the water trap before returning to the reaction flask. The solution was heated to reflux and was allowed to reflux vigorously for four hours, at the end of which time the theoretical amount of water had collected in the water trap. The solution was then concentrated to dryness under reduced pressure and the yellow crystalline residue was triturated with cold acetone to yield 7.13 grams (79 percent) of 3-(N-pyrrolidyl)-3,5-cholestadiene; melting point 135 to 138 degrees centigrade (with decomposition). Recrystallization from a methylene chloride-methanol mixture raised the melting point to 138 to 140 degrees centigrade (with decomposition); $[\alpha]_D^{23}$ minus 110 degrees (chloroform).

*Analysis.*—Percent calculated for $C_{31}H_{51}N$: N, 3.20. Found: N, 3.25.

*Example 2.—3-(N-pyrrolidyl)-3,5,22-stigmastatriene*

A solution of 8.22 grams (0.02 mole) of stigmastadienone and 6.52 milliliters (0.08 mole) of pyrrolidine in 100 milliliters of benzene was placed in a reaction flask which was equipped with a reflux condenser and a water trap so arranged that the condensed vapors passed through the water trap before returning to the reaction flask. The solution was heated to reflux and was allowed to reflux viporously for one hour, at the end of which time the theoretical amount of water had collected in the water trap. The solution was then concentrated to dryness under reduced pressure and the crystalline residue was triturated with cold methanol and filtered. The yield of 3-(N-pyrrolidyl)-3,5,22-stigmastatriene was 8.72 grams (94 percent); melting point 149 to 151 degrees centigrade (with decomposition). Recrystallization from a mixture of methylene chloride-ethyl acetate raised the melting point to 153 to 155 degrees centigrade (with decomposition); $[\alpha]_D^{23}$ minus 121 degrees (chloroform).

*Analysis.*—Percent calculated for $C_{33}H_{53}N$: C, 85.45; H, 11.52; N, 3.02. Found: C, 85.56; H, 11.52; N, 3.07.

*Example 3.—3-(N-pyrrolidyl)-2 (or 3)-cholestene*

A solution of 8.79 grams of cholestan-3-one and 6.7 milliliters of pyrrolidine in 100 milliliters of benzene was placed in a reaction flask which was equipped with a reflux condenser and a water trap so arranged that the condensed vapors passed through the water trap before returning to the reaction flask. The solution was heated to reflux and was allowed to reflux vigorously for 2.5 hours, at the end of which time the theoretical amount of water had collected in the water trap. The solution was then concentrated to dryness under reduced pressure and the yellow crystalline residue was triturated with cold acetone and filtered. The yield of 3-(N-pyrrolidyl)-2 (or 3)-cholestene was 9.53 grams; melting point 98 to 110 degrees centigrade (with decomposition). The position of the double bond in this product may be either between carbon atoms 2 and 3 or 3 and 4 and it has not been definitely determined at which one of these two positions it is located. Recrystallization from methylene chloride-methanol raised the melting point to 105 to 110 degrees centigrade (with decomposition); $[\alpha]_D^{23}$ plus 45 degrees (chloroform).

*Analysis.*—Percent calculated for $C_{31}H_{53}N$: N, 3.19. Found: N, 3.20.

*Example 4.—3-(N-pyrrolidyl)-3,5-pregnadien-20-one*

A solution of 3.15 grams (0.01 mole) of progesterone and 3.34 milliliters (0.04 mole) of pyrrolidine in fifty milliliters of benzene was placed in a reaction flask which was equipped with a reflux condenser and a water trap so arranged that the condensed vapors passed through the water trap before returning to the reaction flask. The solution was heated to reflux and was allowed to reflux, with stirring, for one hour at the end of which time thirty milligrams of para-toluenesulfonic acid was added. After an additional thirty minutes of refluxing, the theoretical amount of water (0.18 milliliter) had collected in the water trap. The solution was then concentrated to dryness under reduced pressure and the yellow crystalline residue was triturated with twenty milliliters of methanol, cooled at four degrees centigrade for one hour, filtered, washed with twenty milliliters of cold methanol, and dried. The yield of 3-(N-pyrrolidyl)-3,5-pregnadien-20-one was 3.57 grams (97 percent); melting point 160 to 173 degrees centigrade (with decomposition). A small quantity, recrystallized from ether for analysis, melted at 170 to 175 degrees centigrade (with decomposition); $[\alpha]_D^{24}$ minus 22 degrees (chloroform).

*Analysis.*—Percent calculated for $C_{27}H_{37}ON$: C, 81.69; H, 10.15; N, 3.81. Found: C, 81.96; H, 10.39; N, 3.83.

*Example 5.—3-(N-pyrrolidyl)-3,5-pregnadien-11α-ol-20-one*

A solution of 3.30 grams (0.01 mole) of 11α-hydroxyprogesterone [prepared as described by Peterson and Murray in J. Am. Chem. Soc., 74, 1872 (1952)] and 3.34 milliliters (0.04 mole) of pyrrolidine in fifty milliliters of benzene was placed in a reaction flask which was equipped with a reflux condenser and a water trap so arranged that the condensed vapors passed through the water trap before returning to the reaction flask. The solution was heated to reflux and was allowed to reflux vigorously for two hours, at the end of which time the theoretical amount of water (0.18 milliliter) had collected in the water trap. The solution was then concentrated to dryness under reduced pressure and the yellow solid residue was triturated with twenty milliliters of methanol, cooled at four degrees centigrade for one hour, filtered, washed with twenty milliliters of cold methanol, and dried. The yield of 3-(N-pyrrolidyl)-3,5-pregnadien-11α-ol-20-one was 3.31 grams (86 percent); melting point 145 to 152 degrees centigrade (with decomposition); $[\alpha]_D^{24}$ minus 126 degrees (chloroform).

*Analysis.*—Percent calculated for $C_{25}H_{37}O_2N$: C, 78.29; H, 9.73; N, 3.91. Found: C, 78.10; H, 9.75; N, 3.93.

Example 6.—3-(N-pyrrolidyl)-3,5-pregnadien-11β-ol-20-one

Following the procedure given in Example 5, and allowing the reaction mixture to reflux for five hours, 3-(N-pyrrolidyl)-3,5-pregnadien-11β-ol-20-one was prepared from 11β-hydroxyprogesterone by reaction with pyrrolidine. The yield was 74 percent and the melting point was 175 to 185 degrees centigrade (with decomposition).

*Analysis.*—Percent calculated for $C_{25}H_{37}O_2N$: N, 3.91. Found: N, 3.97.

Example 7.—3-(N-pyrrolidyl)-3,5-pregnadiene-11,20-dione

Following the procedure given in Example 5, and allowing the reaction mixture to reflux for four hours, 3-(N-pyrrolidyl)-3,5-pregnadiene-11,20-dione was prepared from 11-ketoprogesterone by reaction with pyrrolidine. The yield was quantitative and the melting point was 180 to 185 degrees centigrade (with decomposition).

*Analysis.*—Percent calculated for $C_{25}H_{35}O_2N$: N, 3.67. Found: N, 3.68.

Example 8.—Methyl 3-(N-pyrrolidyl)-7,12-diketo-2-(or 3)-cholenate

A solution of 3.12 grams (0.01 mole) of methyl 3,7,12-triketocholanate and 3.44 milliliters (0.04 mole) of pyrrolidine in fifty milliliters of benzene was placed in a reaction flask which was equipped with a reflux condenser and a water trap so arranged that the condensed vapors passed through the water trap before returning to the reaction flask. The solution was heated to reflux and was allowed to reflux vigorously for four hours at the end of which time the theoretical amount of water had collected in the water trap. The solution was then concentrated to dryness under reduced pressure and the crystalline residue was dried and recrystallized from a methylene chloride-methanol mixture. The yield of methyl 3-(N-pyrrolidyl)-7,12-diketo-2(or 3)-cholenate was 86 percent; melting point 165 degrees centigrade (with decomposition). The position of the double bond in this product may be either between carbon atoms 2 and 3 or 3 and 4 and it has not been definitely determined at which one of these two positions it is located.

*Analysis.*—Percent calculated for $C_{29}H_{43}O_4N$: C, 74.17; H, 9.22; N, 2.98. Found: C, 73.91; H, 9.05; N, 2.74.

Example 9.—3-(N-pyrrolidyl)-3,5-androstadien-11α-ol-17-one

A solution of 1.21 grams (0.004 mole) of 11α-hydroxy-4-androstene-3,17-dione [Peterson and Murray, J. Am. Chem. Soc., 74, 1872 (1952)] and 1.34 milliliters of pyrrolidine in 25 milliliters of benzene was placed in a reaction flask which was equipped with a reflux condenser and a water trap so arranged that the condensed vapors passed through the water trap before returning to the reaction flask. The solution while being stirred, was heated to reflux and was allowed to reflux vigorously for four hours at the end of which time the theoretical amount of water had collected in the water trap. The solution was then concentrated to dryness under reduced pressure and the residue was dissolved in ten milliliters of ether. Crystallization took place and after cooling, the product was filtered, washed with cold ether and dried. The yield of 3-(N-pyrrolidyl)-3,5-androstadien-11α-ol-17-one was 0.81 gram; melting point 140 to 147 degrees centigrade (with decomposition). For analysis a sample was recrystallized from ether and melted at 161 to 166 degrees centigrade (with decomposition); $[\alpha]_D^{23}$ minus 165 degrees (pyridine).

*Analysis.*—Percent calculated for $C_{23}H_{33}O_2N$: C, 77.69; H, 9.36; N, 3.94. Found: C, 77.68; H, 9.15; N, 4.00.

Example 10.—3-(N-pyrrolidyl)-3,5-androstadiene-11,17-dione

A solution of 1.50 grams of adrenosterone and 1.67 milliliters of pyrrolidine in thirty milliliters of benzene was placed in a reaction flask which was equipped with a reflux condenser and a water trap so arranged that the condensed vapors passed through the water trap before returning to the reaction flask. The solution was heated to reflux and was allowed to reflux, with stirring, for one hour, at the end of which time ten milligrams of para-toluenesulfonic acid was added. After an additional one hour of refluxing, the theoretical amount of water had collected in the water trap. The solution was then concentrated to dryness under reduced pressure to give 1.75 grams of crude yellow crystalline 3-(N-pyrrolidyl)-3,5-androstadiene-11,17-dione. A small quantity, recrystallized from ether for analysis, melted at 173 to 178 degrees centigrade (with decomposition); $[\alpha]_D^{24}$ minus 60 degrees (pyridine).

*Analysis.*—Percent calculated for $C_{23}H_{31}O_2N$: C, 78.14; H, 8.84. Found: C, 78.24; H, 8.72.

Example 11.—3-(N-pyrrolidyl)-17-methyl-3,5-androstadien-17-ol

A solution of 3.02 grams (0.01 mole) of methyl testosterone and 3.34 milliliters (0.04 mole) of pyrrolidine in fifty milliliters of benzene was placed in a reaction flask which was equipped with a reflux condenser and a water trap so arranged that the condensed vapors passed through the water trap before returning to the reaction flask. The solution was heated to reflux and was allowed to reflux, with stirring, for three hours, at the end of which time the theoretical amount of water had collected in the water trap. The solution was then concentrated to dryness under reduced pressure and the yellow solid residue was triturated with twenty milliliters of methanol, cooled at four degrees centigrade for one hour, filtered, washed with twenty milliliters of cold methanol, and dried. The yield of 3-(N-pyrrolidyl)-17-methyl-3,5-androstadien-17-ol was 3.25 grams (91 percent); melting point 145 to 152 degrees centigrade (with decomposition). A sample recrystallized for analysis and melted at 160 to 170 degrees centigrade (with decomposition); $[\alpha]_D^{24}$ minus 93 degrees (pyridine).

*Analysis.*—Percent calculated for $C_{23}H_{35}ON$: C, 81.69; H, 10.49; N, 3.94. Found: C, 81.54; H, 10.49; N, 3.93.

Example 12.—3-(N-pyrrolidyl)-3,5-androstadien-17-one

A solution of 8.58 grams (0.30 mole) of 4-androstene-3,17-dione and 10.02 milliliters (0.12 mole) of pyrrolidine in 150 milliliters of benzene was placed in a reaction flask which was equipped with a reflux condenser and a water trap so arranged that the condensed vapors passed through the water trap before returning to the reaction flask. The solution, while being stirred, was heated to reflux and was allowed to reflux vigorously for three hours, at the end of which time the theoretical amount of water head collected in the water trap. The solution was then concentrated to dryness under reduced pressure and the yellow crystalline residue was triturated with fifty milliliters of methanol. After cooling for six hours at four degrees centigrade the product was filtered, washed with 23 milliliters of cold methanol and dried. The yield of 3-(N-pyrrolidyl)-3,5-androstadien-17-one was 9.15 grams (90 percent); melting point 195 to 200 degrees centigrade (with decomposition). For analysis a sample was recrystallized from methylene chloride-methanol and melted at 200 to 205 degrees centigrade (with decomposition); $[\alpha]_D^{24}$ minus 135 degrees (chloroform).

*Analysis.*—Percent calculated for $C_{23}H_{33}ON$: C, 81.35; H, 9.80; N, 4.13. Found: C, 81.31; H, 9.55; N, 4.29.

Example 13.—3-(N-pyrrolidyl)-3,5-androstadien-17β-ol

The reaction flask of a Soxhlet extraction apparatus was charged with a solution of 3.8 grams (0.10 mole) of lithium aluminum hydride in 1600 milliliters of anhydrous ether, and the extraction thimble was charged with 6.09 grams (0.018 mole) of 3-(N-pyrrolidyl)-3,5-androstadien-17-one. Heat was applied to the reaction flask until the ether was refluxing. The condensed vapors on passing through the thimble dissolved the steroid and carried it into the reaction flask where reduction was accomplished. Reflux was maintained for 45 minutes, at the end of which time all of the steroid had been dissolved. The reaction mixture was cooled, carefully decomposed by the addition of ten milliliters of water, and extracted with benzene. The benzene solution was dried and concentrated to dryness to yield 5.25 grams (86 percent) of crude 3-(N-pyrrolidyl)-3,5-androstadien-17β-ol. A sample was recrystallized from methylene chloride-methanol to give yellow needles with a melting point of 133 to 137 degrees centigrade.

*Analysis.*—Percent calculated for $C_{23}H_{35}ON$: N, 4.13. Found: N, 4.07.

The same compound, 3-(N-pyrrolidyl)-3,5-androstadien-17β-ol, is also obtained by allowing testosterone to react with pyrrolidine according to the procedure given in Example 12.

Example 14.—Testosterone

A solution of 4.25 grams of 3-(N-pyrrolidyl)-3,5-androstadien-17β-ol (from Example 13), 7.5 grams sodium acetate, eight milliliters of water, and two milliliters of concentrated hydrochloric acid in 150 milliliters of methanol was refluxed for three hours. The solution was then diluted with 200 milliliters of water, cooled, and the precipitated testosterone was filtered, washed with water, and dried. The yield was 2.64 grams (73 percent) of melting point 149 to 150 degrees centigrade.

Example 15.—Preparation of other enamines

The following enamines can be prepared in a manner essentially as described hereinbefore:

a. 3-(diethylamino)-3,5-cholestadiene by reaction of cholestenone with diethylamine.

b. 3-(dibutylamino)-3,5-cholestadiene by reaction of cholestenone with dibutylamine.

c. 3 - (dicyclohexylamino) - 3,5 - pregnadien - 20 - one by reaction of progesterone with dicyclohexylamine.

d. 3 - (dibenzylamino) - 3,5 - pregnadien - 20 - one by reaction of progesterone with dibenzylamine.

e. 3 - (methyl benzylamino) - 3,5 - androstadien - 17 - one by reaction of 4-androstene-3,17-dione with methyl benzylamine.

f. 3 - (N - piperidyl) - 3,5 - androstadien - 17 - one by reaction of 4-androstene-3,17-dione with piperidine.

g. 3 - (dipropylamino) - 3,5 - androstadien - 17 - one by reaction of 4-androstene-3,17-dione with dipropylamine.

h. 3 - (N - piperidyl) - 3,5,22 - stigmastatriene by reaction of 4,22-stigmastadien-3-one with piperidine.

i. 3 - (dicyclopentylamino) - 3,5 - androstadien - 17 - ol by reaction of testosterone with dicyclopentylamine.

j. 3 - (ethyl benzylamino) - 3,5 - pregnadiene - 11,20 - dione by reaction of 11-ketoprogesterone with ethyl benzylamine.

k. 3 - (diethylamino) - 3,5 - pregnadien - 11α - ol - 20-one by reaction of 11α-hydroxyprogesterone with diethylamine.

l. 3 - (dioctylamino) - 3,5 - pregnadien - 11β - ol - 20-one by reaction of 11β-hydroxyprogesterone with dioctylamine.

m. 3 - (N - morpholino) - 3,5 - pregnadien - 20 - one by reaction of progesterone with morpholine.

n. 3 - (N - oxazolidino) - 3,5 - androstadien - 17 - one by reaction of 4-androstene-3,17-dione with oxazolidine.

As previously mentioned, and as more specifically shown in Example 14, the steroid enamines of the present invention are useful intermediates for the preparation of physiologically active steroid hormones, and in addition are useful for the preparation of still other steroid compounds which may be active per se or which can be converted to known active steroid hormones. Such steroid enamines, for example, as those described in Examples 4, 5, 6, 7, 8, 9, and 10, and others can be reduced and the 3-ketone group regenerated by acid hydrolysis to give the corresponding hydroxy 3-ketosteroid. For example 3 - (N - pyrrolidyl) -3,5 - androstadiene - 11,17-dione from Example 10 and 3 - (N - pyrrolidyl) - 3,5-pregnadien-11α-ol-20-one from Example 5 on reduction with lithium aluminum hydride or other reducing agents and regeneration of the 3-ketone group by acid hydrolysis give 11β-hydroxytestosterone and 11α,20-dihydroxy-4-pregnen-3-one, respectively.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. 3-(N-pyrrolidyl)-3,5-androstadiene-11,17-dione.
2. 3-(N-pyrrolidyl)-3,5-androstadien-17-one.
3. 3-(N-pyrrolidyl)-3,5-pregnadiene-11,20-dione.
4. 3 - (N - pyrrolidyl)-17-methyl-3,5-androstadien-17-ol.
5. 3-(N-pyrrolidyl) - 3,5-androstadien - 11-ol-17-one.
6. A process for the production of 3-(N-pyrrolidyl)-3,5-androstadiene-11,17-dione which comprises heating together andrenosterone and pyrrolidine, in an organic solvent, at a temperature between about forty and about 110 degrees centigrade, and separating the 3 - (N-pyrrolidyl)-3,5-androstadiene-11,17-dione thus-formed.
7. A process for the production of 3-(N-pyrrolidyl)-3,5-androstadien-17-one which comprises heating together 4-androstene-3,17-dione and pyrrolidine, in an organic solvent, at a temperature between about forty and about 110 degrees centigrade, and separating the 3-(N-pyrrolidyl)-3,5-androstadien-17-one thus-formed.
8. A process for the production of 3-(N-pyrrolidyl)-17-methyl-3,5-androstadien-17-ol which comprises heating together 17-methyltestosterone and pyrrolidine, in an organic solvent at a temperature between about forty and about 110 degrees centigrade, and separating the 3-(N-pyrrolidyl)-17-methyl-3,5 - androstadien - 17 - ol thus-formed.
9. A process for the production of 3-(N-pyrrolidyl)-3,5-pregnadien-11,20-dione which comprises heating together 11-ketoprogesterone and pyrrolidine, in an organic solvent, at a temperature between about forty and about 110 degrees centigrade, and separating the 3-(N-pyrrolidyl)-3,5-pregnadien-11,20-dione thus-formed.
10. A process for the production of 3-(N-pyrrolidyl)-3,5-androstadien-11-ol-17-one which comprises heating together 11-hydroxy-4-androstene-3,17-dione and pyrrolidine, in an organic solvent at a temperature between about forty and about 110 degrees centigrade, and separating the 3-(N-pyrrolidyl)-3,5-androstadien-11-ol-17-one thus-formed.
11. A process for the production of testosterone which includes the steps of (1) reacting 4-androstene-3,17-dione with a secondary amine selected from the group consisting of dialkylamines, dicycloalkylamines, diaralkylamines, alkylaralkylamines, piperidine, pyrrolidine, tetrahydroquinoline, oxazolidine, and morpholine, to produce a 3-(tertiaryamino)-3,5-androstadien-17-one, (2) reducing the thus-produced 3-(tertiaryamino)-3,5-androstadien-17-one to produce a 3-(tertiaryamino)-3,5-androstadien-17-ol and (3) hydrolyzing the thus-produced 3-(tertiaryamino)-3,5-androstadien-17-ol to produce testosterone.
12. A process for the production of testosterone which includes the steps of (1) reacting 4-androstene-3,17-dione with pyrrolidine to produce 3-(N-pyrrolidyl)-3,5-androstadien-17-one, (2) reducing the 17-ketone of the thus-produced 3-(N-pyrrolidyl)-3,5-androstadien-17-one with lithium aluminum hydride and (3) hydrolyzing the thus-produced 3-(N-pyrrolidyl)-3,5-androstadien17-ol to produce testosterone.

13. A 3-(N-pyrrolidyl)-17-ketosteroid having an androstane carbon skeleton wherein the A ring of the steroid nucleus is nonaromatic and contains a double bond attached to the 3-carbon atom.

14. A 3-(N-pyrrolidyl)-11,17-diketosteroid having an androstane carbon skeleton wherein the A ring of the steroid nucleus is nonaromatic and contains a double bond attached to the 3-carbon atom.

15. A 3-(N-pyrrolidyl)-20-ketosteroid having a pregnane carbon skeleton wherein the A ring of the steroid nucleus is nonaromatic and contains a double bond attached to the 3-carbon atom.

16. A 3-(N-pyrrolidyl)-11,20-diketosteroid having a pregnane carbon skeleton wherein the A ring of the steroid nucleus is nonaromatic and contains a double bond attached to the 3-carbon atom.

17. A process for the selective conversion of the 3-carbonyl oxygen of a 3,20-diketopregnane to an N-pyrrolidyl group which comprises heating together a 3,20-diketopregnane and pyrrolidine, in an organic solvent, to produce a 3-(N-pyrrolidyl)-20-ketopregnane, wherein the A ring of the steroid nucleus contains a double bond attached to the 3-carbon atom.

18. A process for the selective conversion of the 3-carbonyl oxygen of a 3,11,20-triketopregnane to an N-pyrrolidyl group which comprises heating together a 3,11,20-triketopregnane and pyrrolidine, in an organic solvent, to produce a 3-(N-pyrrolidyl)-11,20-diketopregnane, wherein the A ring of the steroid nucleus contains a double bond attached to the 3-carbon atom.

19. A process for the production of 11-beta-hydroxytestosterone which includes the steps of (1) reacting 4-androstene-3,11,17-trione with a secondary amine selected from the group consisting of dialkylamines, dicycloalkylamines, diaralkylamines, alkylaralkylamines, piperidine, pyrrolidine, tetrahydroquinoline, oxazolidine, and morpholine, to produce a 3-(tertiaryamino)-3,5-androstadiene-11,17-dione, (2) reducing the thus-produced 3-(tertiaryamino) - 3,5-androstadiene-11,17-dione to produce a 3-(tertiaryamino)-3,5-androstadiene-11-beta, 17-beta-diol, and (3) hydrolyzing the thus-produced 3-(tertiaryamino)-3,5-androstadiene-11-beta, 17 - beta-diol to produce 11-beta-hydroxytestosterone.

20. A process for the production of 11-beta-hydroxytestosterone which includes the steps of (1) reacting 4-androstene-3,11,17-trione with pyrrolidine to produce 3-(N-pyrrolidyl)-3,5-androstadiene-11,17-dione, (2) reducing the thus-produced 3-(N-pyrrolidyl)-3,5-androstadiene-11,17-dione to produce 3-(N-pyrrolidyl)-3,5-androstadiene-11-beta, 17-beta-diol, and (3) hydrolyzing the thus-produced 3-(N-pyrrolidyl)-3,5-androstadiene-11-beta, 17-beta-diol to produce 11-beta-hydroxytestosterone.

References Cited in the file of this patent

UNITED STATES PATENTS

| | | |
|---|---|---|
| 2,340,388 | Inhoffen | Feb. 1, 1944 |
| 2,422,904 | Inhoffen | June 24, 1947 |